US009097279B2

(12) United States Patent
Flores et al.

(10) Patent No.: US 9,097,279 B2
(45) Date of Patent: Aug. 4, 2015

(54) ROTATING SHAFT TOP COVER ATTACHED MOTOR

(71) Applicant: Seagate Technology LLC, Cupertino, CA (US)

(72) Inventors: Paco Gregor Flores, Felton, CA (US); Matthew M. McConnell, Scotts Valley, CA (US)

(73) Assignee: Seagate Technology LLC, Cupertino, CA (US)

( * ) Notice: Subject to any disclaimer, the term of this patent is extended or adjusted under 35 U.S.C. 154(b) by 168 days.

(21) Appl. No.: 13/923,249

(22) Filed: Jun. 20, 2013

(65) Prior Publication Data

US 2014/0376843 A1    Dec. 25, 2014

(51) Int. Cl.
*F16C 32/06* (2006.01)

(52) U.S. Cl.
CPC .................. *F16C 32/0607* (2013.01)

(58) Field of Classification Search
CPC ....... F16C 32/06; F16C 17/102; F16C 17/107
See application file for complete search history.

(56) References Cited

U.S. PATENT DOCUMENTS

| | | | |
|---|---|---|---|
| 5,847,479 A * | 12/1998 | Wang et al. ................ | 310/90 |
| 5,993,066 A | 11/1999 | Leuthold et al. | |
| 6,371,650 B1 * | 4/2002 | Goto et al. ................ | 384/110 |
| 6,776,529 B2 * | 8/2004 | Khan et al. ................ | 384/107 |
| 6,917,130 B2 | 7/2005 | Aiello et al. | |
| 6,991,376 B2 | 1/2006 | Aiello et al. | |
| 7,619,339 B2 | 11/2009 | Hendriks | |
| 8,379,345 B2 | 2/2013 | Mizukami et al. | |
| 8,385,017 B2 | 2/2013 | Mizukami et al. | |
| 2001/0026652 A1 * | 10/2001 | Takahashi .................. | 384/107 |
| 2002/0089245 A1 | 7/2002 | Chen et al. | |
| 2004/0174078 A1 | 9/2004 | Kull | |
| 2005/0220380 A1 | 10/2005 | Shindo et al. | |
| 2006/0078240 A1 * | 4/2006 | Braun ........................ | 384/107 |
| 2009/0092345 A1 | 4/2009 | Hendriks et al. | |
| 2011/0064342 A1 | 3/2011 | Aiello | |
| 2011/0285232 A1 | 11/2011 | Le et al. | |
| 2013/0033137 A1 * | 2/2013 | Yu ................................ | 310/90 |
| 2013/0129268 A1 * | 5/2013 | Cheong et al. ............. | 384/107 |

OTHER PUBLICATIONS

International Search Report and Written Opinion, PCT Application No. PCT/US2014/043015, mailed Oct. 7, 2014.

* cited by examiner

*Primary Examiner* — Thomas R. Hannon

(57) ABSTRACT

Provided herein, is an apparatus that includes a stationary component, a rotatable component, and an upper journal bearing and a lower journal bearing. The upper journal bearing and the lower journal bearing are defined in a gap between the stationary component and the rotatable component, and the stationary component and rotatable component are configured for relative rotation. A thrust bearing is disposed between the upper journal bearing and the lower journal bearing.

18 Claims, 5 Drawing Sheets

ROTATING SHAFT TOP COVER ATTACHED MOTOR

BACKGROUND

Disk drives are capable of storing large amounts of digital data in a relatively small area. Disk drives store information on one or more recording media, which may take the form of circular storage disks (e.g. media) having a plurality of concentric circular recording tracks. A disk drive may have one or more disks for storing information. This information is written to and read from the disks using read/write heads mounted on actuator arms that are moved from track to track across the surfaces of the disks by an actuator mechanism.

Over the years, storage density has tended to increase, and the size of the storage system has tended to decrease. This trend has led to greater precision in the manufacturing and operating of magnetic storage disks.

SUMMARY

Provided herein, is an apparatus that includes a stationary component, a rotatable component, and an upper journal bearing and a lower journal bearing. The upper journal bearing and the lower journal bearing are defined in a gap between the stationary component and the rotatable component, and the stationary component and rotatable component are configured for relative rotation. A thrust bearing is disposed between the upper journal bearing and the lower journal bearing.

These and other features and advantages will be apparent from a reading of the following detailed description.

DRAWINGS

Various embodiments are illustrated by way of example, and not by way of limitation, in the figures of the accompanying drawings and in which like reference numerals refer to similar elements.

DESCRIPTION

Figure 1:
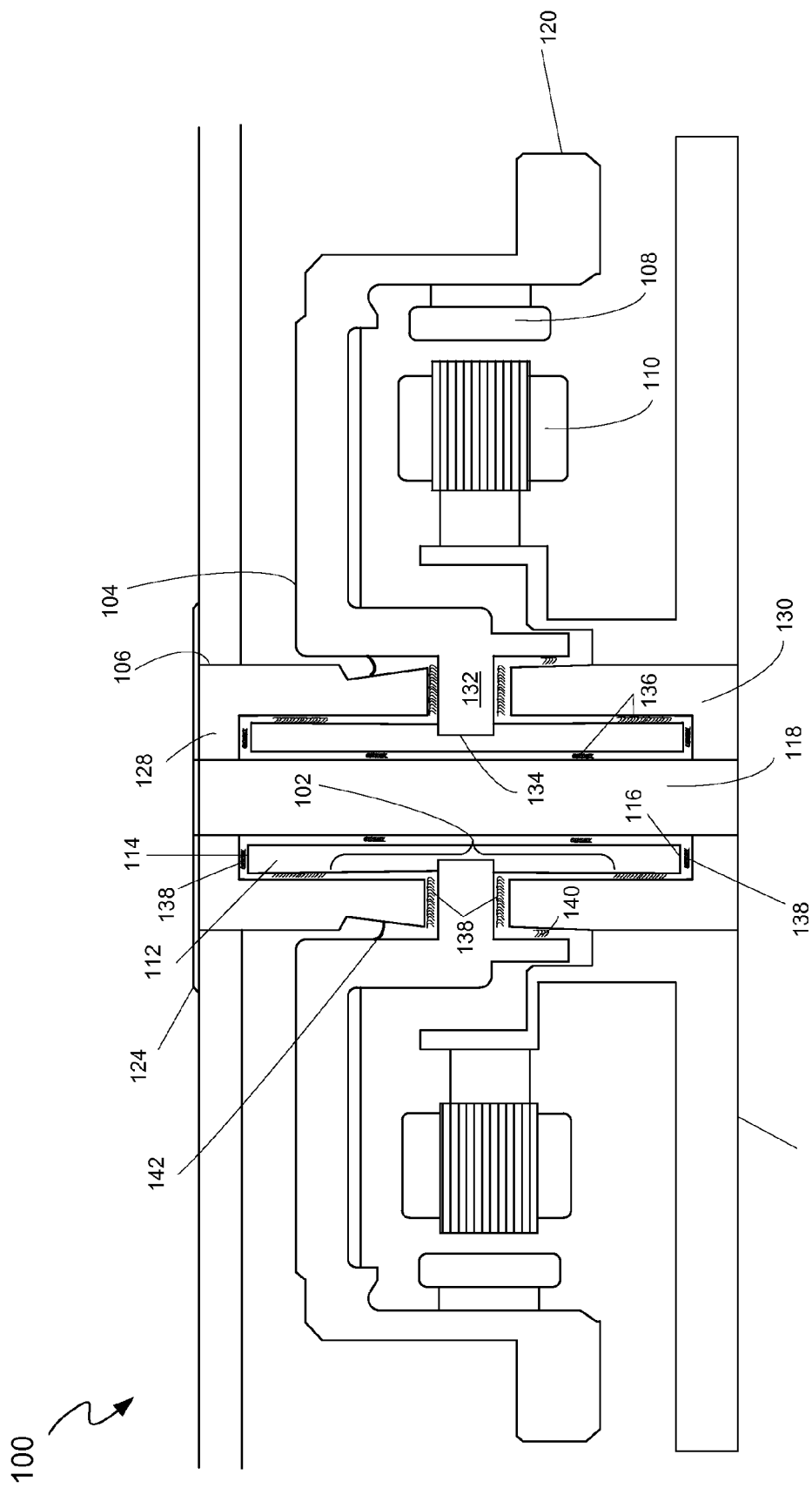
FIG. 1 illustrates a cross sectional view of a fluid dynamic bearing motor with an elongated journal bearing span according to one aspect of the present embodiments.

Before various embodiments are described in greater detail, it should be understood that the embodiments are not limited to the particular embodiments described and/or illustrated herein, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

An apparatus is described herein for embodiments of a rotating shaft top cover attached fluid dynamic bearing motor. The features of the disclosed embodiments, for example, include a long journal span between journal bearings for increased angular stiffness. In addition, a single and/or dual thrust bearing is disposed between the journal bearings, thereby effectively increasing the distance between the upper journal bearing and the lower journal bearing. The thrust bearing, for example, may be formed between a first surface of a thrust plate and a top cup and/or a second surface of the thrust plate and a bottom cup.

Embodiments described herein, relocate the thrust plate and hub/shaft interface from an axial end of the shaft to a more centered shaft position, thereby increasing the journal bearing span and increasing mechanical damping. For example, the hub/shaft interface takes up axial space along the shaft. If the hub/shaft interface is located at the top of the shaft (e.g., spacing of the components along the shaft is in the order of: hub/shaft interface, upper journal bearing, and lower journal bearing), a region at the top of the shaft is occupied by the hub/shaft interface. Thus, the upper journal bearing and the lower journal bearing are spaced in the remainder of the shaft below the hub/shaft interface, thereby reducing the overall length of the journal bearing span between the upper journal bearing and the lower journal bearing.

However, in embodiments described herein, the hub/shaft interface is located away from axial ends of the shaft and between the upper journal bearing and the lower journal bearing (e.g., spacing of the components along the shaft is in the order of: upper journal bearing, hub/shaft interface, and lower journal bearing). Thus, the journal bearings may be pushed out to axial ends of the shaft with the hub/shaft interface being positioned along the shaft between the upper and lower journal bearings, thereby maximizing the journal bearing span along the shaft.

As a result, for the same amount of energy or bearing force being applied to a fluid dynamic bearing motor, more angular stiffness is achieved by increasing the length of the overall journal bearing span. Furthermore, by disposing the thrust bearing between the upper journal bearing and the lower journal bearing the overall journal span or journal length is increased, without sacrificing motor height and/or overall system structural design.

The various embodiments will now be described in greater detail.

FIG. 1 illustrates a cross-sectional view of a fluid dynamic bearing motor 100 with a long journal span 102 formed between a rotatable component 104 and a stationary component 106, wherein a data storage disk (not shown) may be rotated at high speeds during operation using magnets 108 and a stator 110 in accordance with one embodiment. The rotatable component 104 may include a shaft 112, having a first axial end 114 and a second axial end 116. According to an embodiment, a tie member 118 may be disposed through the shaft 112. Thus, the shaft 112 may be a hollow shaft surrounding the tie member 118. Furthermore, the rotatable component 104 may include a hub 120, configured to support the data storage disk for relative rotation.

The stationary component 106 includes the tie member 118, an upper cup 128, and a lower cup 130. The tie member 118 may be affixed to a top cover 124, the upper cup 128, a base 126, and/or the lower cup 130. For exemplary purposes, the tie-member 118 and the top cover 124 are stationary components that are not relative to rotation, or movement, with respect to one another. The term affixed is set out to define a structural relationship with respect to binding, tying, bonding, or any other term which may illustrate a physical, or mechanical, bonding to of the two elements. However, it is appreciated that the description of affixing the tie member 118 to the top cover 124, the upper cup 128, the base 126, and/or the lower cup 130 is exemplary and not intended to limit the scope of the embodiments.

According to an embodiment, the upper and lower cups 128, 130 may be integral to the top cover 124 and the base 126 (e.g., a single unitary piece). By connecting the tie member 118 to both the top cover 124 and the base 126, structural system stiffness is significantly improved while compromising little axial space due to the location of a hub/shaft interface 134 away from the axial ends of the shaft.

In various embodiments, the tie member 118 does not form a bearing with the shaft 112. However, in other embodiments, the tie member 118 may form one or more bearings with the shaft 112. The bearings may be grooved or ungrooved. In further embodiments, axially facing surfaces of the tie member 118 and/or the shaft 112 may include grooves configured to pump fluid.

According to an embodiment, the hub 120 may support one or more disks (not shown) for rotation. Furthermore, a cylindrical bore (not shown) may be formed through the middle of the hub 120 for receiving the shaft 112. The shaft 112 may be, for example, a two-piece shaft according to an embodiment. The magnet 108 is mounted to the hub 120 and cooperates with the stator 110 to induce rotation of the hub 120.

According to an embodiment, a thrust plate 132 may be positioned near a mid-shaft, or a more centered shaft 112 location (e.g., away from axial ends of the shaft 112), wherein the thrust plate 132 is located between a set of journal bearings 136 (also see FIG. 2), thereby increasing the journal bearing span 102 and gaining a dynamic response advantage. In another example, the set of journal bearings 136 may be disposed between the shaft 112 and the tie member 118 to increase the angular bearing stiffness of the motor 100.

According to an embodiment, the thrust plate 132 may include a single thrust bearing and/or a dual thrust bearing 138 wherein grooves may be formed between a first and/or second face of the thrust plate 132 and the upper and lower cups 128, 130 to pump fluid throughout the motor 100. Furthermore, the thrust bearing 138 may be formed between a first surface of the upper cup 128 and a first radially facing surface of the shaft 112 and/or formed between a first surface of the lower cup 130 and a second radially facing surface of the shaft 112. Moreover, the thrust plate 132 may include ungrooved surfaces between the upper and lower cups 128, 130. Furthermore, a single thrust bearing may include grooved or ungrooved surfaces formed between the upper and/or lower axial ends of the shaft 112 and the corresponding radially facing side of the upper and/or lower cups 128, 130. According to another embodiment, grooved surfaces may be disposed between the tie-member 118 and the shaft 112.

Furthermore, by disposing the hub/shaft interface 134, and the thrust plate 132 at a more centered shaft position, the overall motor height and system structural design are not affected and the angular stiffness of the bearing may be increased. Also, the hub/shaft interface 134 allows a system design wherein the journal bearings may be pushed towards opposite axial ends of the shaft 112 thereby increasing the journal bearing span 102 without sacrificing motor height. By disposing the hub/shaft interface 134 and the thrust plate 132 between the upper and lower cups 128, 130, a more stable system may be designed that allows for an increasing angular stiffness within the motor 100 with a larger, elongated journal bearing span 102.

According to an embodiment, a set of pumping seals 140 may be disposed with the gaps between the stationary components 106 and the rotatable components 104 to block fluid from being displaced throughout the motor 100. In other words, the pumping seals 140 may provide increased reliability and performance for small form factor disc drive memory systems. The grooved region may function as pumping seals 140 and/or to recirculate lubricating fluid through portions of the motor 100. In essence, as a bearing pumps oil in a desired direction, the pumping seal 140 may be placed at one end of the bearing wherein the oil being pumped throughout the motor 100 is contained within the motor 100. According to another embodiment, the bearing may utilize an asymmetric fluid sealing system with a set of capillary seals 142 situated on one end of the bearing, and the set of pumping seals 140 on an opposite bearing end. Thus, the pumping seals 140 and the capillary seals 142 allow an equalization of pressure within the motor 100 wherein the oil may not be pumped from the confinements of the motor 100.

Figure 2:
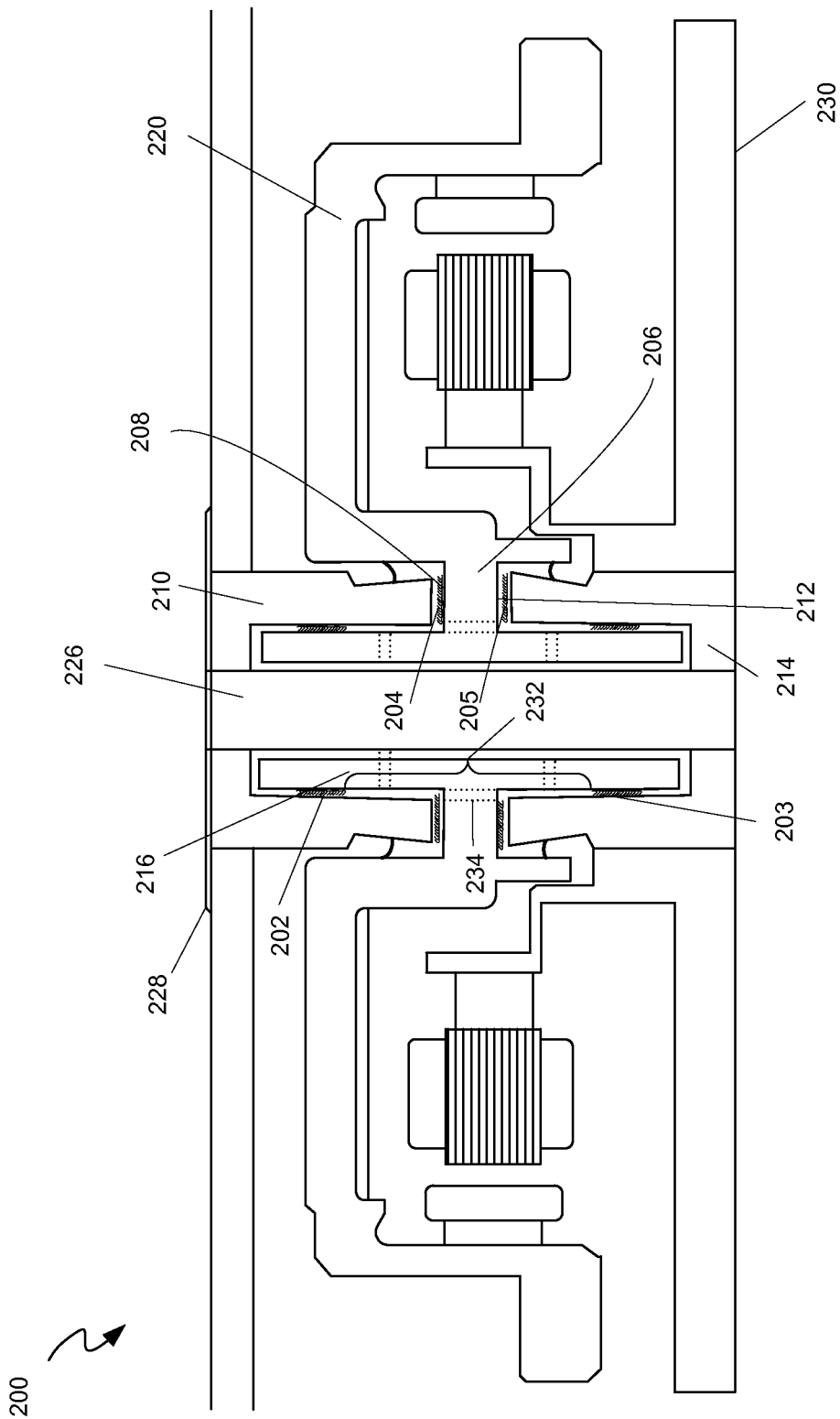
FIG. 2 illustrates a fluid dynamic bearing with a thrust plate and single piece shaft according to one aspect of the present embodiments.

FIG. 2 illustrates a cross-sectional view of a fluid dynamic bearing motor 200 with an upper journal bearing 202, a lower journal bearing 203, an upper thrust bearing 204, and a lower thrust bearing 205. According to an embodiment, a thrust plate 206 may form the upper thrust bearing 204 between a first surface 208 of the thrust plate 206 and an upper cup 210. The thrust plate 206 may further form the lower thrust bearing 205 between a second surface 212 of the thrust plate 206 and a lower cup 214. The thrust bearings may be grooved or ungrooved, and may, for example, pump fluid throughout the motor 200. Furthermore, the thrust plate 206 may form only a single thrust bearing in the gap between the upper or lower cup 210, 214 and the thrust plate 206.

A shaft 216 may have a tie member 226 disposed through the shaft 216. According to an embodiment, the shaft 216 may be a hollow shaft. The tie member 226 is disposed through the shaft 216 and affixed to a top cover 228 and a base 230.

Furthermore, by positioning the thrust bearings away from axial ends of the shaft 216 (e.g. to a more centered position along the shaft 216), axial space at the end of the shaft 216 does not need to be reserved for the thrust plate 206. Thus, overall angular and/or radial stiffness may be increased by allowing the upper journal bearing 202 and the lower journal bearing 203 to be positioned near respective axial ends along the shaft 216. In other words, by disposing the thrust plate 206 in a more centered position along the shaft 216, the upper and lower journal bearings 202, 203 may be spaced further apart without increasing motor height, or sacrificing axial space along the shaft 216. Effectively, a journal span 232 is elongated thereby increasing the angular stiffness of the bearing within the motor 200.

In various embodiments, the shaft 216 and the hub 220 may be a unitary piece that is formed as a single unit (e.g. single piece mold, 3-D printing, milling, forging, metal injection molding, di-cast molding, injection, etc.). In some embodiments (see FIG. 1), the shaft 216 may be a single piece shaft that is attached to the thrust plate 206 of a hub 220 (e.g. through welding, adhesive, press-fitting, etc.). Furthermore, recirculation paths 234 may be formed in the hub 220 and shaft 216 interface to equalize pressures within the motor 200.

Figure 3A:
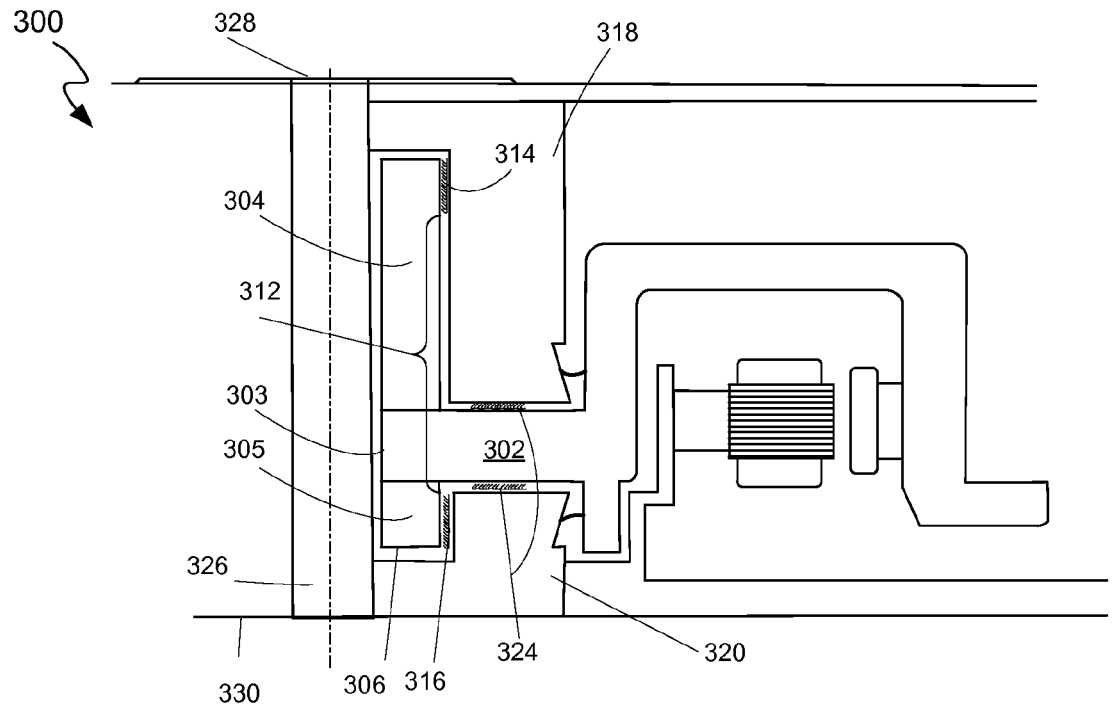
FIG. 3A illustrates a cross sectional view of a lower hub/shaft interface according to one aspect of the present embodiments.
Figure 3B:
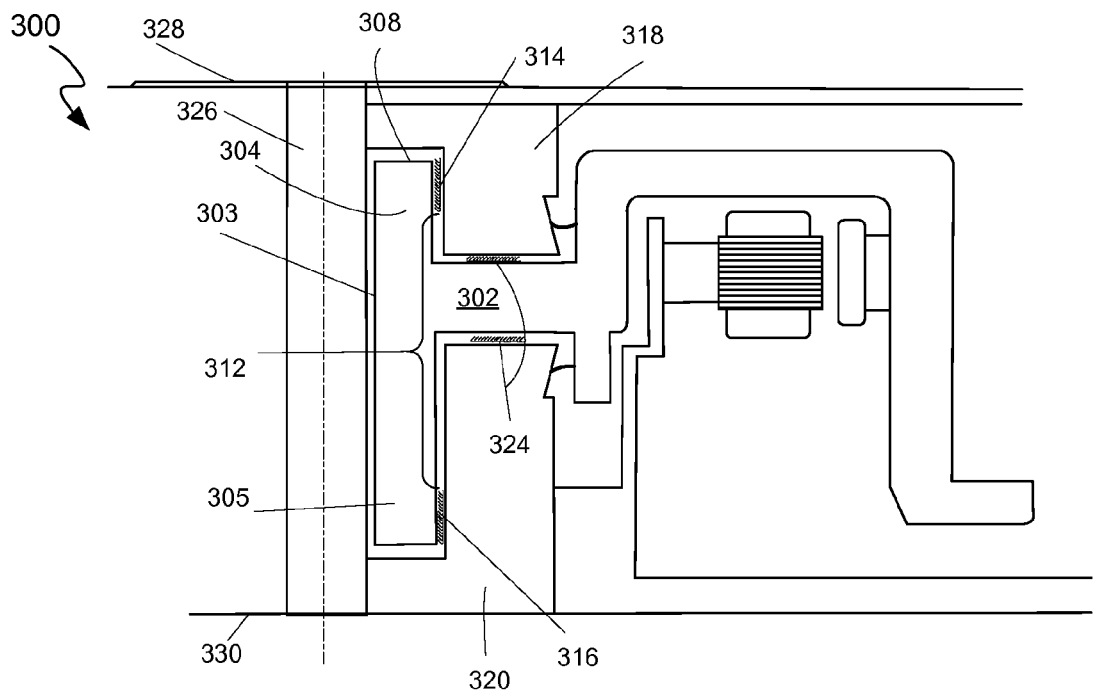
FIG. 3B illustrates a cross sectional view of an upper hub/shaft interface according to one aspect of the present embodiments.

FIGS. 3A and 3B illustrate a cross-sectional view of a fluid dynamic bearing motor 300 including a thrust plate 302 and a hub/shaft interface 303 positioned at different axial locations along a two piece shaft. The two piece shaft may include an upper shaft 304 and a lower shaft 305. In various embodiments the shaft may be a unitary shaft, including an upper portion (corresponding to upper shaft 304) and a lower portion (corresponding to lower shaft 305) which are defined by the location of the thrust plate 302.

In FIG. 3A, according to an embodiment, the hub/shaft interface 303 and thrust plate 302 may be affixed in a first position. The first position, for example, may be a position closer to a first axial end 306 of the lower shaft 305, wherein the axial length of the lower shaft 305 is reduced in comparison to the axial length of the upper shaft 304. In other words, by positioning the hub/shaft interface 303 closer to the first axial end 306 more axial space is provided on the upper shaft 304 wherein less axial space is provided on the lower shaft 305.

Furthermore, an upper journal bearing 314 and a lower journal bearing 316 may be disposed in a gap between the upper and lower shafts 304, 305 and an upper and a lower cup 318, 320. In particular, the upper journal bearing 314 is formed between the upper cup 318 and an axially facing side of the upper shaft 304 and the lower journal bearing 316 is formed between the lower cup 320 and an axially facing side of the lower shaft 305. Both the upper and lower journal bearings 314, 316 may be configured to pump fluid throughout the motor 300.

A journal span 312 may be elongated by disposing the hub/shaft interface 303 between the upper and lower journal bearings 314, 316. In other words, the upper and lower journal bearings 314, 316 are pushed further apart by locating the upper and lower journal bearings 314, 316 towards respective axial ends of the upper and lower shafts 304, 305. This, in essence, allows a bearing to achieve a higher stiffness (e.g., angular stiffness) during operation of the motor 300 without sacrificing motor height. Furthermore, a single or dual thrust bearing 324 may be formed in a gap between the hub/shaft interface 303, the upper cup 318, and lower cup 320. The thrust bearing 324 may be grooved or ungrooved and may be configured to pump fluid throughout the motor.

The surface of the upper shaft 304 and/or the upper cup 318 may include additional grooves. Thus with this design, the extra axial space along the upper shaft 304 may be taken advantage of to provide more grooves along the surface of the upper shaft 304 and/or the upper cup 318. The additional grooves may, for example, increase pressure to pump fluid throughout the motor 300 and increase the angular stiffness of the bearing. Therefore, by moving the upper and lower journal bearings 314, 316 to respective axial ends of the upper and lower shafts 304, 305, and locating the thrust plate 302 between, both angular stiffness and radial stiffness may be increased, thereby allowing for a more stable, reliable fluid dynamic bearing motor.

In FIG. 3B, according to an embodiment, the hub/shaft interface 303 and/or the thrust plate 302 may be affixed in a second position. The hub/shaft interface 303, the thrust plate 302, an upper shaft portion 304, and a lower shaft portion 305 may all be formed as a single unitary piece (e.g. not requiring assembly of the components). The second position, for example, may be positioned closer to a first axial end 308 of the upper shaft portion 304, wherein the axial length of the upper shaft portion 304 is reduced in comparison to the axial length of the lower shaft portion 305. In other words, by positioning the hub/shaft interface 303 closer to the first axial end 308 more axial space is provided on the lower shaft portion 305 wherein less axial space is provided on the upper shaft portion 304.

As in FIG. 3A, the upper and lower journal bearings 314, 316 are pushed further apart by locating the upper and lower journal bearings 314, 316 towards respective axial ends of the upper and lower shaft portions 304, 305. By increasing or decreasing the amount of axial space yielded on the upper and/or lower shaft portions 304, 305 and the size of the upper and lower journal bearings 314, 316, a designer may have the option to increase or decrease the amount of pressure being applied to the bearing, thereby adjusting angular and radial stiffness to a particular desire or range.

FIGS. 3A and 3B both illustrate various embodiments, wherein the thrust plate 302 and the hub/shaft interface 303 may be positioned along the upper and lower shafts 304, 305 configurations. According to an embodiment, the upper and lower shafts 304, 305 may be formed or affixed to the thrust plate 302 (e.g., welding, adhesive, press-fitting, etc.). In various embodiments, the upper and lower shafts 304, 305 and a hub may be single or unitary piece formed as a single unit (e.g., single piece mold, 3-D printing, milling, 3-D printing, milling, forging, metal injection molding, di-cast molding, injection, etc.). According to yet another embodiment, the upper and lower shafts 304, 305 may be formed as a singular or unitary shaft design, wherein the thrust plate 302 is affixed to the unitary shaft.

As illustrated in FIGS. 3A and 3B, a tie member 326 may be disposed thru the upper and lower shafts (or shaft portions) 304, 305, and connected at one axial end to a top cover 328 and at an opposite axial end to a base 330. By attaching the tie member 326 to the top cover 328 and the base 330, system stability and overall motor functionality may be enhanced. Also, the overall stiffness of the system may be improved and the angular stiffness may be increased.

Figure 4A:
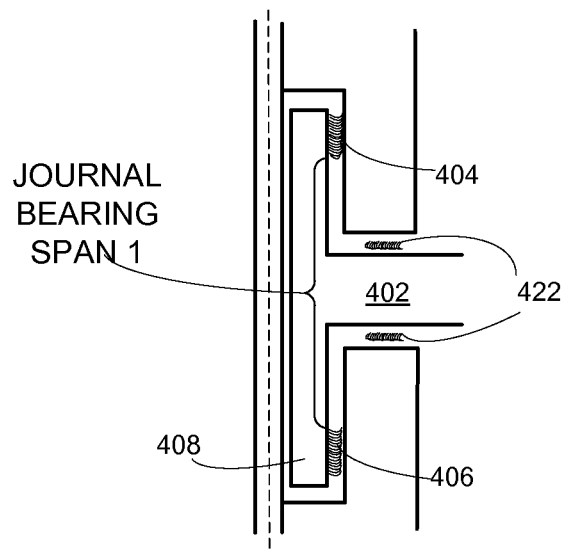
FIG. 4A illustrates an elongated journal bearing span with a hub/shaft interface disposed between an upper and a lower journal bearing according to one aspect of the present embodiments.
Figure 4B:
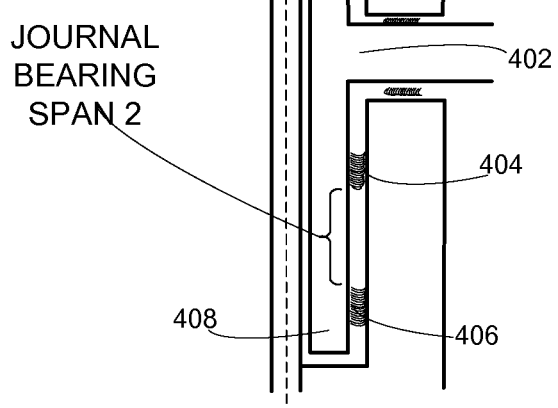
FIG. 4B illustrates a shortened journal bearing span according to one aspect of the present embodiments.

FIGS. 4A and 4B, according to an embodiment, further illustrate multiple journal bearing span widths wherein the position or location of a hub/shaft interface determines the overall journal bearing span. In FIG. 4A the hub/shaft interface 402 is disposed between an upper journal bearing 404 and a lower journal bearing 406. In other words, the upper and lower journal bearings 404, 406 are pushed further apart and towards opposite ends of a shaft 408. By disposing the hub/shaft interface between the upper and lower journal bearings 404, 406 the length of the journal bearing span 1 is maximized without sacrificing axial space along the shaft 408.

On the other hand, as illustrated in FIG. 4B the hub/shaft interface 402 may not be disposed between the upper and lower journal bearings 404, 406. Instead, the hub/shaft interface may be disposed near an axial end of the shaft 408. Thus, the upper and lower journal bearings 404, 406 may be pushed closer together, thereby reducing the length of the overall journal bearing span 2.

Although FIG. 4B may function as a top cover attached rotating shaft motor, FIG. 4A may result in greater bearing stiffness as a top cover attached rotating shaft motor. Thus, FIG. 4A may allow more flexibility and design options, wherein angular stiffness and overall system stability may be increased, without the need for increasing motor height and/or adding extra components to achieve a desired robustness. Journal bearing span 1, as illustrated in FIG. 4A, is larger, or wider, than journal bearing span 2, as illustrated in FIG. 4B (e.g., Journal Bearing span 1>Journal Bearing span 2).

Figure 4C:
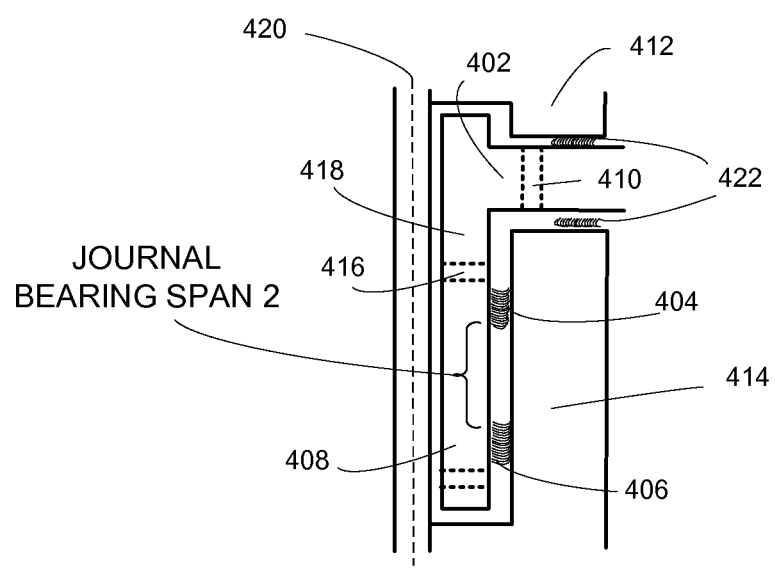
FIG. 4C illustrates a recirculation path according to one aspect of the present embodiments.

Furthermore, FIG. 4C illustrates a top cover attached rotating shaft motor with a recirculation path 410 formed so that lubricant fluid can be formed in the hub assembly 402 to equalize pressures. The recirculation path may be, for example, an integral recirculation path 410 for the disc drive memory system. The recirculation path 410, according to another embodiment, may be machined directly into the hub assembly 402. In other words, the recirculation path 410 may be positioned between an upper cup 412 and lower cup 414 and disposed through the hub 410 as an integral recirculation path, or be machined directly into the hub 402.

According to another embodiment, a second set of recirculation paths 416 may be, for example, positioned through a portion of a shaft 418 wherein the recirculation paths may be located between the hub 410 and the upper journal bearing 404. Alternatively, the second set of recirculation paths 416 may be, for example, positioned through a second portion of the shaft 418 wherein the recirculation paths may be located between the lower cup 414 and the lower journal bearing 406. The second set of recirculation paths 416 may provide more design options to equalize pressure by allowing fluid to pump throughout the fluid dynamic motor.

Furthermore, according to an embodiment, a tie-member 420 may be disposed through the shaft 418 wherein the tie-member 420 increases the overall stiffness and stability of the fluid dynamic motor. Also, a single or dual thrust bearing 422 may be disposed between the upper cup 412 and a first side of the hub 402 and/or between a second side of the hub 402 and the lower cup 414. By positioning the thrust bearing 422 in an upper shaft 418 position, the angular stiffness of the upper and lower journal bearings 404, 406 may be increased.

Therefore, as illustrated in FIG. 4A, by positioning a single or dual thrust bearing 422 between the upper and lower journal bearings 404, 406 the radial bearing is optimized. In other words, to achieve a higher optimization and increased radial bearing stiffness, the radial bearing may be aligned, or in-line, with the dispatch and disposed between the upper and lower journal bearings 404, 406. Furthermore, as illustrated in FIGS. 4B and 4C, the thrust bearing 422 may be positioned on either sides of the upper and lower journal bearings 404, 406 thereby allowing a more optimal angular stiffness by placing the thrust bearing 422 nearer the axial ends of the shaft 418.

Figure 5:
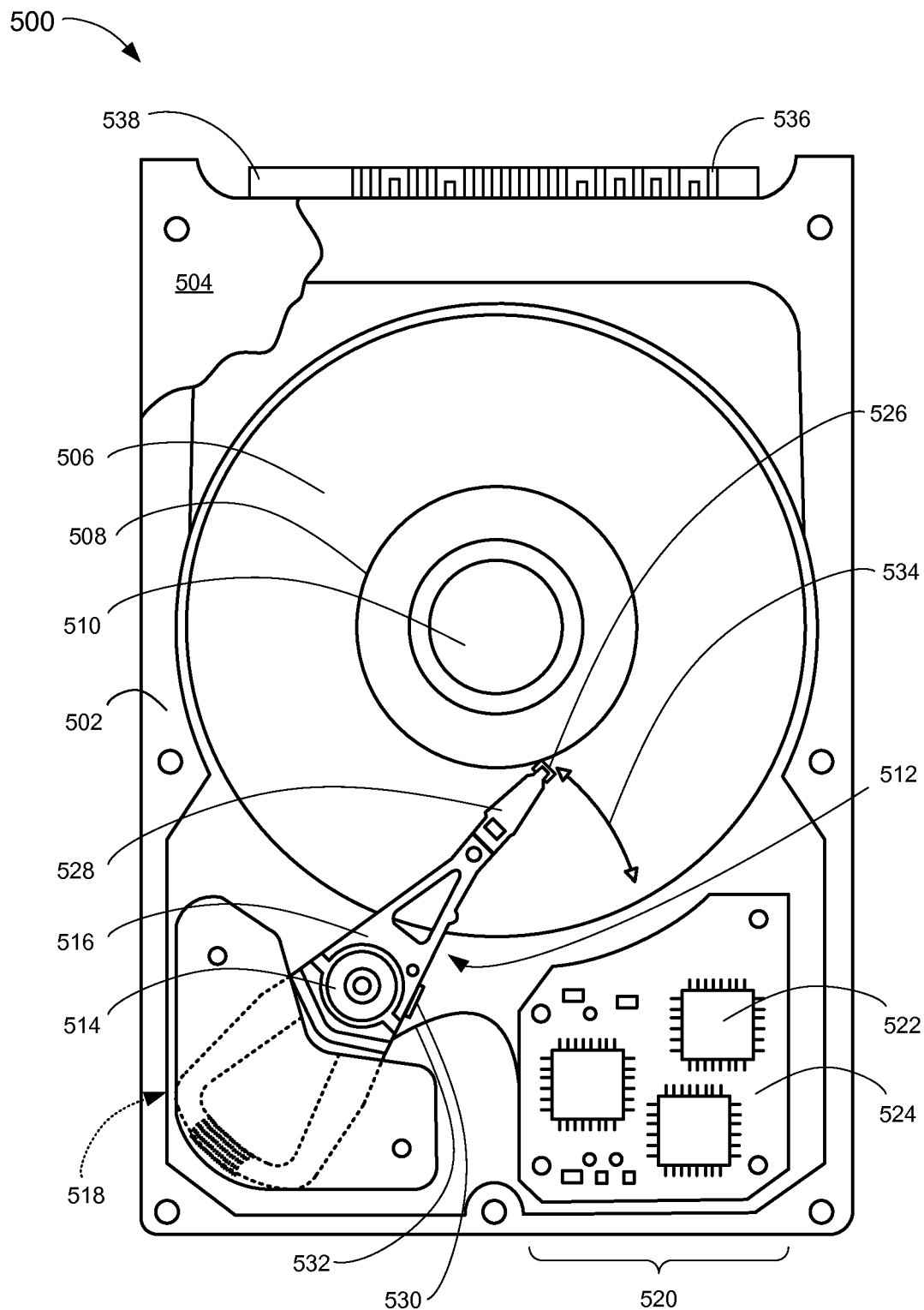
FIG. 5 illustrates a plan view of a data storage device, according to one aspect of the present embodiments.

FIG. 5 is a plan view of a data storage device in which fluid dynamic bearings (e.g., journal bearings, thrust bearings conical bearings) described herein may be used. In particular, the fluid dynamic journal bearing may be separated, or pushed apart, by disposing a thrust plate or hub/shaft interface between an upper journal bearing and a lower journal bearing thus creating a longer journal bearing span and increasing usable axial space along a shaft within the data storage device.

A disk drive 500 generally includes a base plate 502 and a top cover 504 that may be disposed on the base plate 502 to define an enclosed housing for various disk drive components. The disk drive 500 includes one or more data storage disks 506 of computer-readable data storage media. Typically, both of the major surfaces of each data storage disk 506 include a plurality of concentrically disposed tracks for data storage purposes. Each data storage disk 506 is mounted on a hub 508, which in turn is rotatably interconnected with the base plate 502 and/or cover 504. Multiple data storage disks 506 are typically mounted in vertically spaced and parallel relation on the hub 508. A spindle motor 510 rotates the data storage disks 506.

The disk drive 500 also includes an actuator arm assembly 512 that pivots about a pivot bearing 514, which in turn is rotatably supported by the base plate 502 and/or cover 504. The actuator arm assembly 512 includes one or more individual rigid actuator arms 516 that extend out from near the pivot bearing 514. Multiple actuator arms 516 are typically disposed in vertically spaced relation, with one actuator arm 516 being provided for each major data storage surface of each data storage disk 506 of the disk drive 500. Other types of actuator arm assembly configurations could be utilized as well, an example being an "E" block having one or more rigid actuator arm tips, or the like, that cantilever from a common structure. Movement of the actuator arm assembly 512 is provided by an actuator arm drive assembly, such as a voice coil motor 518 or the like. The voice coil motor 518 is a magnetic assembly that controls the operation of the actuator arm assembly 512 under the direction of control electronics 520.

The control electronics 520 may include a plurality of integrated circuits 522 coupled to a printed circuit board 524. The control electronics 520 may be coupled to the voice coil motor assembly 518, a slider 526, or the spindle motor 510 using interconnects that can include pins, cables, or wires (not shown).

A load beam or suspension 528 is attached to the free end of each actuator arm 516 and cantilevers therefrom. Typically, the suspension 528 is biased generally toward its corresponding data storage disk 506 by a spring-like force. The slider 526 is disposed at or near the free end of each suspension 528. What is commonly referred to as the read/write head (e.g., transducer) is appropriately mounted as a head unit (not shown) under the slider 526 and is used in disk drive read/write operations. The head unit under the slider 526 may utilize various types of read sensor technologies such as anisotropic magnetoresistive (AMR), giant magnetoresistive (GMR), tunneling magnetoresistive (TuMR), other magnetoresistive technologies, or other suitable technologies.

The head unit under the slider 526 is connected to a preamplifier 530, which is interconnected with the control electronics 520 of the disk drive 500 by a flex cable 532 that is typically mounted on the actuator arm assembly 512. Signals are exchanged between the head unit and its corresponding data storage disk 506 for disk drive read/write operations. In this regard, the voice coil motor 518 is utilized to pivot the actuator arm assembly 512 to simultaneously move the slider 526 along a path 534 and across the corresponding data storage disk 506 to position the head unit at the appropriate position on the data storage disk 506 for disk drive read/write operations.

When the disk drive 500 is not in operation, the actuator arm assembly 512 is pivoted to a "parked position" to dispose each slider 526 generally at or beyond a perimeter of its corresponding data storage disk 506, but in any case in vertically spaced relation to its corresponding data storage disk 506. In this regard, the disk drive 500 includes a ramp assembly (not shown) that is disposed beyond a perimeter of the data storage disk 506 to both move the corresponding slider 526 vertically away from its corresponding data storage disk 506 and to also exert somewhat of a retaining force on the actuator arm assembly 512.

Exposed contacts 536 of a drive connector 538 along a side end of the disk drive 500 may be used to provide connectivity between circuitry of the disk drive 500 and a next level of integration such as an interposer, a circuit board, a cable connector, or an electronic assembly. The drive connector 538 may include jumpers (not shown) or switches (not shown) that may be used to configure the disk drive 500 for user specific features or configurations. The jumpers or switches may be recessed and exposed from within the drive connector 538.

Thus, as provided herein, is an apparatus, including a stationary component, a rotatable component, wherein the stationary component and rotatable component are configured for relative rotation, an upper journal bearing and a lower journal bearing defined in a gap between the stationary component and the rotatable component, and a thrust bearing disposed between the upper journal bearing and the lower journal bearing.

In some embodiments, the apparatus further comprises a non-bearing tie member within the stationary component, wherein the non-bearing tie member is affixed to a top cover and a base plate. In some embodiments, the non-bearing tie member is disposed within a shaft. In some embodiments, the stationary component includes a sleeve, and the sleeve includes an upper cup and a lower cup. In some embodiments, the upper cup and the lower cup are separated by the thrust bearing. In some embodiments, the stationary component includes an upper cup, a lower cup, and a tie member, and the rotatable component includes a shaft and a hub. In some embodiments, the apparatus further comprises another thrust bearing between the upper journal bearing and the lower journal bearing.

Also provided herein is an apparatus, including a rotatable shaft, a tie shaft within the rotatable shaft, a top cover affixed to the tie shaft, an upper sleeve cup affixed to the top cover, a lower sleeve cup affixed to a base plate, and a hub affixed to the rotatable shaft between the upper sleeve cup and the lower sleeve cup.

In some embodiments, the apparatus further comprises an upper journal bearing defined in a gap between the rotatable shaft and the upper sleeve cup and a lower journal bearing defined in a gap between the rotatable shaft and the lower sleeve cup. In some embodiments, the apparatus further comprises a thrust bearing positioned at a proximate end or a distal end of a set of journal bearings defined in a gap between the rotatable shaft and the lower sleeve cup. In some embodiments, the upper sleeve cup and the lower sleeve cup are separated by a thrust bearing. In some embodiments, the rotatable component includes a shaft and a hub, and further comprises a recirculation channel in the shaft. In some embodiments, the apparatus further comprises another thrust bearing between the upper journal bearing and the lower journal bearing.

Also provided herein is an apparatus, including an upper journal bearing defined in a gap between a rotatable shaft and an upper sleeve, a lower journal bearing defined in a gap between the rotatable shaft and a lower sleeve, a first thrust bearing between the upper journal bearing and a first thrust surface, and a second thrust bearing between the lower journal bearing and a second thrust surface, wherein the first thrust bearing and the second thrust bearing are between the upper journal bearing and the lower journal bearing.

In some embodiments, the apparatus further comprises a non-bearing tie member within the rotatable shaft, wherein the non-bearing tie member is affixed to a top cover and a base plate. In some embodiments, the apparatus further comprises a stationary component that includes an upper cup, a lower cup, and a tie member, and a rotatable component that includes a shaft and a hub. In some embodiments, the upper sleeve and the lower sleeve are separated by a thrust plate comprising the first thrust bearing and the second thrust bearing. In some embodiments, the apparatus further comprises a recirculation channel in the rotatable shaft. In some embodiments, the rotatable shaft comprises an upper shaft and a lower shaft.

While embodiments have been described and/or illustrated by means of examples, and while these embodiments and/or examples have been described in considerable detail, it is not the intention of the applicant(s) to restrict or in any way limit the scope of the embodiments to such detail. Additional adaptations and/or modifications of the embodiments may readily appear in light of the described embodiments, and, in its broader aspects, the embodiments may encompass these adaptations and/or modifications. Accordingly, departures may be made from the foregoing embodiments and/or examples without departing from the scope of the embodiments. The implementations described above and other implementations are within the scope of the following claims.

What is claimed is:

1. An apparatus comprising:
   a stationary component comprising a non-bearing tie member affixed to a top cover and a base plate;
   a rotatable component, wherein the stationary component and the rotatable component are configured for relative rotation;
   an upper journal bearing and a lower journal bearing defined in a gap between the stationary component and the rotatable component; and
   a thrust bearing disposed between the upper journal bearing and the lower journal bearing.

2. The apparatus of claim 1, wherein the non-bearing tie member is disposed within a shaft, and the stationary component includes the non-bearing tie member.

3. The apparatus of claim 1, wherein the stationary component includes a sleeve, and the sleeve includes an upper cup and a lower cup.

4. The apparatus of claim 3, wherein the upper cup and the lower cup are separated by the thrust bearing.

5. The apparatus of claim 1, wherein the rotatable component includes a shaft, and further comprising a recirculation channel in the shaft.

6. The apparatus of claim 1, wherein
   the stationary component includes an upper cup, a lower cup, and the non-bearing tie member, and
   the rotatable component includes a shaft and a hub.

7. The apparatus of claim 1, further comprising another thrust bearing between the upper journal bearing and the lower journal bearing.

8. An apparatus comprising:
   a rotatable shaft comprising a recirculation channel;
   a tie shaft within the rotatable shaft;
   a top cover affixed to the tie shaft;
   an upper sleeve cup affixed to the top cover;
   a lower sleeve cup affixed to a base plate; and
   a hub affixed to the rotatable shaft between the upper sleeve cup and the lower sleeve cup.

9. The apparatus of claim 8, further comprising an upper journal bearing defined in a gap between the rotatable shaft and the upper sleeve cup; and a lower journal bearing defined a gap between the rotatable shaft and the lower sleeve cup.

10. The apparatus of claim 8, wherein the hub is affixed to the rotatable shaft at a hub/shaft interface, and further comprising a lower journal bearing and an upper journal bearing wherein the upper journal bearing is between the lower journal bearing and the hub/shaft interface.

11. The apparatus of claim 8, further comprising a stationary component that includes the upper sleeve cup and the lower sleeve cup wherein the upper sleeve cup and the lower sleeve cup are separated by a thrust bearing.

12. The apparatus of claim 8, further comprising a thrust bearing between the upper sleeve cup and the lower sleeve cup.

13. An apparatus comprising:
    an upper journal bearing defined in a gap between a rotatable shaft and an upper sleeve;
    a lower journal bearing defined in a gap between the rotatable shaft and a lower sleeve;
    a first thrust bearing between the upper journal bearing and a first thrust surface; and
    a second thrust bearing between the lower journal bearing and a second thrust surface, wherein the first thrust bearing and the second thrust bearing are between the upper journal bearing and the lower journal bearing.

14. The apparatus of claim 13, further comprising a non-bearing tie member within the rotatable shaft, wherein the non-bearing tie member is affixed to a top cover and a base plate.

15. The apparatus of claim 13, further comprising a stationary component that includes the upper sleeve and the lower sleeve.

16. The apparatus of claim 13, further comprising a thrust plate that includes the first thrust surface and the second thrust surface wherein the first thrust bearing and the second thrust bearing are disposed on the thrust plate.

17. The apparatus of claim 13, wherein the rotatable shaft comprises an upper shaft and a lower shaft that is separated by the first thrust bearing and the second thrust bearing.

18. The apparatus of claim 13, further comprising a recirculation channel in the rotatable shaft.

\* \* \* \* \*